United States Patent
Yamakita et al.

(10) Patent No.: US 9,289,034 B2
(45) Date of Patent: Mar. 22, 2016

(54) FASTENER STRINGER AND SLIDE FASTENER

(75) Inventors: Yoshimichi Yamakita, Toyama (JP); Takashi Mori, Toyama (JP); Tadahiro Inomata, Toyama (JP)

(73) Assignee: YKK Corporation (JP)

( * ) Notice: Subject to any disclaimer, the term of this patent is extended or adjusted under 35 U.S.C. 154(b) by 130 days.

(21) Appl. No.: 13/884,311

(22) PCT Filed: Nov. 10, 2010

(86) PCT No.: PCT/JP2010/070012
§ 371 (c)(1),
(2), (4) Date: May 9, 2013

(87) PCT Pub. No.: WO2012/063332
PCT Pub. Date: May 18, 2012

(65) Prior Publication Data
US 2013/0219674 A1    Aug. 29, 2013

(51) Int. Cl.
*A44B 19/34* (2006.01)
*A44B 19/12* (2006.01)
(Continued)

(52) U.S. Cl.
CPC ............. *A44B 19/34* (2013.01); *A44B 19/12* (2013.01); *B29D 5/02* (2013.01); *D01D 5/253* (2013.01); *Y10T 24/25* (2015.01); *Y10T 24/2518* (2015.01)

(58) Field of Classification Search
CPC ........ A44B 19/00; A44B 19/10; A44B 19/12; A44B 19/14; A44B 19/16; A44B 19/24; D01D 5/253; B29D 5/02; Y10T 24/25; Y10T 24/2518

USPC .................................................... 24/381, 391
See application file for complete search history.

(56) References Cited

U.S. PATENT DOCUMENTS

| 3,425,893 A | * | 2/1969 | Sims ............................ 428/397 |
| 4,604,774 A | | 8/1986 | Yamaguchi et al. |
| 4,811,468 A | | 3/1989 | Yamada |

(Continued)

FOREIGN PATENT DOCUMENTS

| JP | 60-179004 A | 9/1985 |
| JP | 85110/1988 | 6/1988 |

(Continued)

OTHER PUBLICATIONS

International Search Report, PCT Application No. PCT/JP2010/070012, mailed Feb. 15, 2011.

*Primary Examiner* — Robert J Sandy
*Assistant Examiner* — Michael Lee
(74) *Attorney, Agent, or Firm* — Kilpatrick Townsend & Stockton LLP

(57) ABSTRACT

A continuous fastener element in a fastener stringer has a plurality of fine projections disposed on a circumferential surface of a monofilament continuously along a length direction of the monofilament and a plurality of recesses disposed between the projections. A cross-sectional shape of the projection is curved convexly, and a cross-sectional shape of the recess is curved concavely. A curvature of the convex curved surface of the projections is set to be larger than a curvature of the concave curved surface of the recess in a cross-section of the monofilament. At least the projections disposed on the upper and lower leg parts are twisted with respect to an extension direction of the upper and lower leg parts, and a plurality of the projections disposed on the upper leg part or the lower leg part in a twisted state face the same direction.

7 Claims, 9 Drawing Sheets

(51) Int. Cl.
    *D01D 5/253*     (2006.01)
    *B29D 5/02*     (2006.01)

(56) References Cited

U.S. PATENT DOCUMENTS 4,912,819 A     4/1990   Yamada
8,950,044 B2 *   2/2015   Yamakita ........................ 24/391

FOREIGN PATENT DOCUMENTS

| | | |
|---|---|---|
| JP | 157309/1988 | 10/1988 |
| JP | 1-19888 B | 4/1989 |
| JP | 7-284404 A | 10/1995 |
| JP | 2005-160667 A | 6/2005 |
| WO | 2010/109658 A1 | 9/2010 |

\* cited by examiner

FASTENER STRINGER AND SLIDE FASTENER

This application is a national stage application of PCT/JP2010/070012 which is incorporated herein by reference.

TECHNICAL FIELD

The invention relates to a fastener stringer to which a continuous fastener element is attached, and more particularly, to a fastener stringer in which gloss and luster on the surface of a fastener element are suppressed, and which exhibits texture different from that of the conventional art.

BACKGROUND ART

In general, a slide fastener is formed, for example, by attaching a coil-shaped or zigzag-shaped continuous fastener element to a fastener tape. In this case, the coil-shaped or zigzag-shaped continuous fastener element is manufactured by extruding a thermoplastic synthetic resin material to mold a linear monofilament, pressing a part of the obtained monofilament at a constant interval to mold a coupling head, and molding the monofilament in a coil shape or a zigzag shape.

Moreover, in a slide fastener having such a continuous fastener element, a method of applying a lubricating material to the outer circumferential surface of the fastener element in order to allow a slider to smoothly slide along the element row or to allow the left and right element rows to smoothly engage with each other is known.

For example, as illustrated in FIG. 13, JP 1-19888 B (Patent Document 1) discloses a configuration in which fine grooves or concave portions 62 are formed on an outer circumferential surface of a fastener element 61 in order to apply a lubricating material to the fastener element 61. Moreover, as an example of a method of forming fine grooves or concave portions 62 on the outer circumferential surface of the fastener element 61, Patent Document 1 discloses a method of forming fine uneven portions around a discharge opening of an extrusion nozzle that extrudes a monofilament to extrude the monofilament from the nozzle and rubbing an outer circumferential surface of the monofilament with a rough surface formed of fine particles or performing a process (for example, a sand blast process) of blasting fine particles with air.

By forming fine grooves or concave portions 62 on the outer circumferential surface of the continuous fastener element 61 in this manner, the lubricating material applied to the fastener element 61 is embedded in the grooves or concave portions 62, and the lubricating material can be properly attached to the fastener element 61. Thus, even when the slide fastener having the fastener element 61 is cleaned, for example, and external force is applied to the lubricating material applied to the fastener element 61 due to the cleaning, it is possible to prevent the lubricating material from being separated from the fastener element 61. Thus, even when the slide fastener is cleaned repeatedly, it is possible to maintain the effect of the lubricating material and to smoothly perform sliding of the slider and the engagement of the element rows over a long period of time.

PRIOR ART DOCUMENT

Patent Document

Patent Document 1: JP 1-19888 B

DISCLOSURE OF THE INVENTION

Problem to be Solved by the Invention

When a coil-shaped or zigzag-shaped continuous fastener element is molded from a monofilament made from a synthetic resin, the obtained fastener element exhibits luster that is peculiar to the monofilament since light is regularly reflected from the monofilament. However, when a slide fastener having the fastener element that exhibits such luster is attached to fastener-attached products such as bags, shoes, or clothes, the luster of the fastener element becomes too conspicuous depending on the design of the fastener-attached products and the fastener element does not match the design of the fastener-attached products.

In order to solve the problem associated with the luster of such a fastener element, the luster of the fastener element 61 may be reduced by forming a number of fine concave portions 62 on the entire outer circumferential surface of the fastener element 61 using the method disclosed in Patent Document 1, for example, although the object of Patent Document 1 is different.

However, when the fine concave portions 62 are formed on the outer circumferential surface of the fastener element 61 in this manner, it is difficult to uniformly form a plurality of concave portions 62 having the same size on the entire outer circumferential surface of the fastener element 61, and local areas where the density of the concave portion 62 is low or high may be formed on the fastener element 61.

When a low-density area of the concave portion 62 is formed on the fastener element 61, it is not possible to sufficiently reduce or remove the luster of the fastener element 61 depending on the material or color of the fastener element 61, and the slide fastener does not match the design of a fastener-attached product in some cases. On the other hand, when a high-density area of the concave portion 62 is formed on the fastener element 61, it is possible to remove the luster of the fastener element 61. However, depending on the diameter of the monofilament that forms the fastener element 61, the concentrated concave portions 62 may decrease the strength of the monofilament, which may cause breaking of the fastener element 61.

Further, when a low-density area and a high-density area of the concave portion 62 are formed on the fastener element 61, the resistance between the slider and the fastener element 61 may change during sliding of the slider when the slider is slid to open or close the slide fastener, for example. Thus, the user operating the slider may feel a sense of incongruity, which may cause an adverse effect on the operability of the slide fastener.

The invention has been made in view of the problems of the conventional art, and a specific object of the invention is to provide a fastener stringer and a slide fastener having the fastener stringer which can maintain the strength of a monofilament and stably reduce or remove the luster peculiar to the monofilament and which does not give a sense of incongruity to the user operating a slider when the fastener stringer forms a slide fastener.

Means for Solving the Problems

In order to attain the object, as a basic configuration, a fastener stringer for a slide fastener according to the invention is a fastener stringer for a slide fastener, in which a continuous fastener element molded from a monofilament made from a thermoplastic resin is attached to a tape edge portion of a fastener tape, and the fastener element includes a coupling head, upper and lower leg parts extending in a tape width direction from the coupling head, and a connecting portion that connects one of the upper and lower leg parts to one of the upper and lower leg parts of the fastener element that is adjacent in a length direction of the fastener tape, mainly characterized in that:

a plurality of fine projections disposed continuously along the length direction of the monofilament and a plurality of recesses disposed between the projections are disposed on the circumferential surface of the monofilament, a cross-sectional shape of the projection is curved convexly, and a cross-sectional shape of the recess is curved concavely, a convex curved surfaces of the projections and a concave curved surfaces of the recesses are alternately formed continuously, a curvature of the convex curved surface of projections is set to be larger than a curvature of the concave curved surface of the recess in a cross-section of the monofilament, at least the projections disposed on the upper and lower leg parts are twisted with respect to an extension direction of the upper and lower leg parts, and a plurality of the projections disposed on the upper leg part or the lower leg part in a twisted state face the same direction.

In the fastener stringer according to the invention, it is preferable that a protruding height of the projection is set in a range from 2.5 μm to 200 μm.

Moreover, it is preferable that the fastener element includes a recess disposed between the projections, and in a cross-sectional view of the monofilament, a diameter of a first imaginary circle that is formed so as to connect bottoms of the recesses has a size that is 80% or more of a diameter of a second imaginary circle that is formed so as to connect apexes of the projections.

In the fastener stringer according to the invention, it is preferable that, in a cross-sectional view of the monofilament, an interval in a circumferential direction between predetermined positions of the projections is set in a range from 24 μm to 200 μm.

Moreover, it is preferable that the number of projections disposed on the circumferential surface of the monofilament is in a range from 12 to 72.

Further, in the fastener stringer according to the invention, as mentioned above, in a cross-sectional view of the monofilament, it may be preferable that a curvature of a convex curved surface of the projection is set to be larger than a curvature of a concave curved surface of the recess.

Furthermore, it is preferable that, in a cross-sectional view of the monofilament, at least one of the projections is configured such that a curved surface portion disposed to extend from the apex to the recess on one side is asymmetrical with respect to another curved surface portion disposed to extend from the apex to the recess on the other side.

Moreover, according to the invention, a slide fastener that includes a pair of left and right fastener stringers having the above-described configuration is provided.

In the slide fastener of the invention, it is preferable that a twisting direction of the projection with respect to the extension direction of the upper and lower leg parts is different between the left and right fastener stringers.

A method for manufacturing a fastener stringer according to the invention is a method for manufacturing a fastener stringer, including extruding and molding a monofilament using an extrusion molding nozzle, molding a continuous fastener element from the monofilament, and sewing the fastener element to a tape edge portion of a fastener tape to manufacture a fastener stringer, mainly characterized in that the method includes: forming a plurality of projections disposed in parallel to each other and continuously along a length direction of the monofilament and a plurality of recesses continuously disposed between the projections on a circumferential surface of the monofilament using the extrusion molding nozzle during the extrusion molding of the monofilament; performing stretching processing on the extrusion-molded monofilament so that a diameter of the monofilament is decreased and a protruding height of the projection is smaller than that immediately after the extrusion molding;

a plurality of fine projections disposed continuously along the length direction of the monofilament and a plurality of recesses disposed between the projections are disposed on the circumferential surface of the monofilament, a cross-sectional shape of the projection is curved convexly, and a cross-sectional shape of the recess is curved concavely, a convex curved surfaces of the projections and a concave curved surfaces of the recesses are alternately formed continuously, a curvature of the convex curved surface of projections is set to be larger than a curvature of the concave surface of the recess in a cross-section of the monofilament, and molding the continuous fastener element from the stretched monofilament.

Effect of the Invention

In the fastener stringer according to the invention, the continuous fastener element molded from the monofilament includes a plurality of fine projections disposed on the circumferential surface of the monofilament continuously along the length direction of the monofilament. Moreover, at least the projections disposed on the upper and lower leg parts are twisted (inclined) with respect to an extension direction of the upper and lower leg parts, and a plurality of the projections disposed on the upper leg part or the lower leg part in a twisted state are disposed so as to face the same direction. In this case, it is preferable that the plurality of projections formed on the upper leg part or the lower leg part are disposed in parallel with each other so as to face the same direction. In the invention, since the fastener element is molded in a continuous shape, it is not possible to dispose the projections strictly in parallel, for example, in a curved portion of the fastener element. Thus, in the invention, the fact that the projections are disposed in parallel means that the projections are disposed approximately in parallel mainly in a straight line portion of the upper and lower leg parts and the like.

In such a continuous fastener element, a plurality of fine projections formed continuously along the length direction of the monofilament is disposed on the circumferential surface of the monofilament so as to face the same direction. Accordingly, it is possible to evenly arrange the projections on the entire circumferential surface of the monofilament. By allowing light to be diffusely (irregularly) reflected from the projections, it is possible to uniformly reduce or remove the luster of the monofilament on the entire circumferential surface.

Moreover, since the projections are disposed in the same direction (preferably in parallel), it is possible to prevent the strength of the monofilament from locally decreasing in the length direction of the monofilament. Further, since the projections are continuously disposed along the length direction of the monofilament, when the slide fastener is formed and the slider is slid, for example, it is possible to prevent the resistance between the slider and the fastener element from changing during the sliding of the slider. Thus, the operability of the slide fastener is not affected.

In particular, in the fastener stringer of the invention, the projections disposed on the upper and lower leg parts of the fastener element are twisted (inclined) with respect to the extension direction of the upper and lower leg parts. Since the arrangement direction of the projections is twisted to be inclined with respect to the extension direction of the upper and lower leg parts in this manner, a larger number of projections can appear on the exposed surface of the fastener element.

Thus, during the stretching processing of the monofilament and the processing of molding the monofilament in a coil shape or a zigzag shape, even when the projections disposed on the circumferential surface of the monofilament are deformed and a variation occurs in the size or shape of the respective projections, since a larger number of projections appear on the exposed surface, the delustering effect can be made uniform in the upper leg part and the lower leg part. Moreover, it is possible to stably reduce or remove the luster of the monofilament on the entire fastener element.

In such a fastener stringer of the invention, the protruding height of the projection is set in the range from 2.5 µm to 200 µm. Since the protruding height of each projection is set to 2.5 µm or more, it is possible to allow light to be stably diffused and reflected from the respective projections and to obtain a stable delustering effect. Moreover, since the protruding height of each projection is set to 200 µm or less, it is possible to stably secure the strength of the fastener element (the monofilament) such that the fastener element can be used in the slide fastener. Further, it is possible to suppress a sense of unevenness on the surface of the element when the fastener element is observed.

In this case, the fastener element has the recess between the respective projections. In a cross-sectional view of the monofilament, the diameter of the first imaginary circle that is formed so as to connect the bottoms of the recesses has a size that is 80% (preferably 90%) or more of the diameter of the second imaginary circle that is formed so as to connect the apexes of the projections.

Due to this, it is possible to stably secure the strength of the fastener element (the monofilament) such that the fastener element can be used in the slide fastener. Although the upper limit proportion of the diameter of the first imaginary circle to the diameter of the second imaginary circle is not particularly limited, it is preferable that the diameter of the first imaginary circle has a size that is 99% or less of the diameter of the second imaginary circle in order to allow light to be diffused and reflected from the projections.

Here, the first and second imaginary circles are imaginary circles that are formed so as to connect the bottoms of the recesses and the apexes of the projections, respectively. It is preferable that the first and second imaginary circles are formed so as to connect the bottoms of all recesses and the apexes of all projections. However, when it is not possible to form such an imaginary circle that connects the bottoms of all recesses or the apexes of all projections, such an approximate imaginary circle that the interval between the bottoms of all recesses or the apexes of all projections is minimized can be used as the first imaginary circle or the second imaginary circle.

In the fastener stringer according to the invention, in a cross-sectional view of the monofilament, the interval in the circumferential direction between the predetermined positions of the projections is set in the range from 24 µm to 200 µm. Here, for example, the interval in the circumferential direction between the predetermined positions of the projections indicates the interval in the circumferential direction between the apexes of the projections or the interval in the circumferential direction between end portions (skirt portions) on one side of the projections and indicates a so-called projection pitch. Since the interval between the projections is set in the range from 24 µm to 200 µm, it is possible to allow light to be effectively diffused and reflected from the projections and to more reliably reduce or remove the luster of the monofilament.

Moreover, the number of projections disposed on the circumferential surface of the monofilament is in the range from 12 to 72, and preferably, in the range from 12 to 48. Due to this, even when light is emitted from any direction, the light can be diffused and reflected from the projections disposed on the circumferential surface of the monofilament, and the luster of the monofilament can be reduced or removed more stably.

Further, in the fastener stringer of the invention, in the cross-sectional view of the monofilament, the curvature of the convex curved surface of the projection is set to be larger than the curvature of the concave curved surface of the recess. Due to this, since light can be more stably diffused and reflected from the projection, and the depth of the recess can be reduced, it is possible to stably secure the strength of the monofilament.

Furthermore, in the cross-sectional view of the monofilament, at least one projection is configured such that one curved surface portion disposed to extend from the apex to the recess on one side is asymmetrical with respect to another curved surface portion disposed to extend from the apex to the recess on the other side. Due to this, light can be prevented from being reflected in the same way from one curved surface portion of the projection and the other curved surface portion. Thus, light can be more effectively diffused and reflected from one projection.

Moreover, in the slide fastener of the invention having a pair of left and right fastener stringers having the above-described configuration, a plurality of projections that is continuous along the length direction of the monofilament is disposed in parallel on the circumferential surface of the monofilament, and the projections disposed on the upper and lower leg parts of the fastener element are twisted with respect to the extension direction of the upper and lower leg parts.

Therefore, by allowing light to be diffused and reflected from the projections formed on the fastener element, the luster of the monofilament on the entire circumferential surface can be reduced or removed uniformly and stably. Thus, the slide fastener of the invention is preferably used in a fastener-attached product or the like in which the luster peculiar to the monofilament does not match the design, for example.

Moreover, in the slide fastener, since the plurality of projections formed on the fastener element are disposed in parallel and continuously along the length direction of the monofilament, it is possible to prevent the strength of the monofilament from locally decreasing in the length direction of the monofilament. Moreover, it is possible to prevent the resistance between the slider and the fastener element from changing abruptly during sliding of the slider. Thus, the slide fastener can be stably used for a long period of time and has excellent operability.

Further, in the slide fastener of the invention, the twisting direction of the projection with respect to the extension direction of the upper and lower leg parts is different between the left and right fastener stringers. Due to this, even when light is emitted to the fastener element in a state where the left and right fastener elements are engaged with each other, the light can be diffused and reflected in different directions from the projections disposed on the left and right fastener elements. Thus, it is possible to reduce or remove the luster of the monofilament more effectively.

Next, according to a method of manufacturing the fastener stringer according to the invention, first, the monofilament is extruded and molded using the extrusion molding nozzle. In this case, since the discharge opening of the extrusion molding nozzle is formed in a toothed wheel shape, for example, when a thermoplastic resin is extruded and molded using the extrusion molding nozzle, it is possible to obtain the monofilament in which a plurality of projections disposed in parallel and continuously along the length direction and a plurality of recesses disposed between the projections are disposed on the circumferential surface.

Subsequently, stretching processing is performed on the extrusion-molded monofilament. In this case, in the manufacturing method of the invention, the stretching processing of the monofilament is performed so that the diameter of the monofilament is decreased, and the protruding height of the projection is smaller than that immediately after the extrusion molding. By performing the stretching processing in such a manner, it is possible to control the diameter of the monofilament to a predetermined size and to enhance the strength of the monofilament.

After that, the continuous fastener element is molded from the stretched monofilament. In this case, the continuous fastener element is molded by pressing the monofilament at a predetermined interval to form the swollen coupling head, and then, winding the monofilament into a coil shape, for example. By molding the continuous fastener element in this manner, it is possible to form the projections on the upper and lower leg parts so as to be twisted with respect to the extension direction of the upper and lower leg parts.

Moreover, by sewing the continuous fastener element molded in this manner to the tape edge portion of the fastener tape, it is possible to stably manufacture the fastener stringer of the invention having the above-described configuration.

MODE(S) FOR CARRYING OUT THE INVENTION

Hereinafter, an embodiment of the invention will be described in detail with reference to the accompanying drawings. The invention is not limited to the embodiments described below, and various changes can be made as long as substantially the same configuration and the same function and effect as the invention are implemented.

For example, although a continuous fastener element described in the following embodiment is formed by molding a monofilament in a coil shape, the invention is not limited to this and the continuous fastener element may be formed by molding the monofilament in a zigzag shape.

Figure 1:
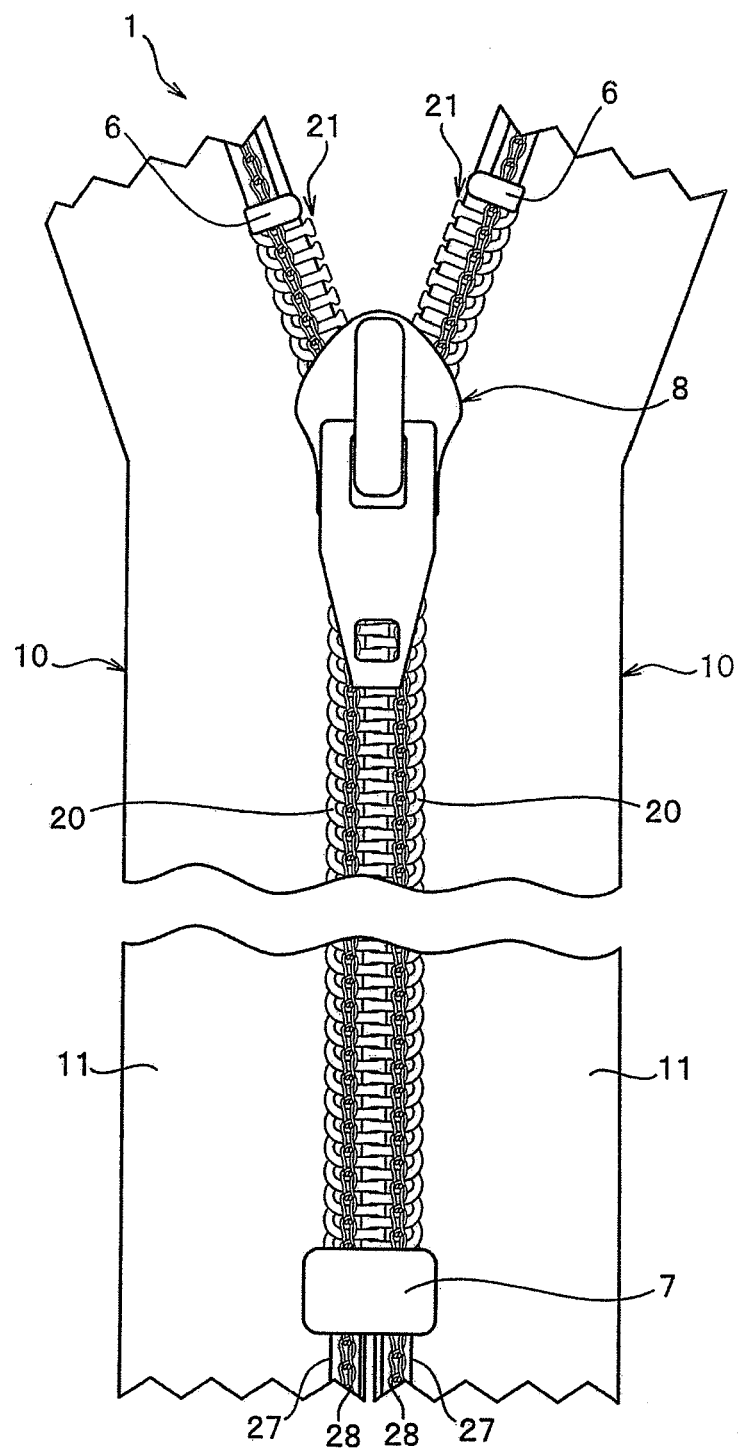
FIG. 1 is a front view illustrating a slide fastener according to an embodiment of the invention.
Figure 2:
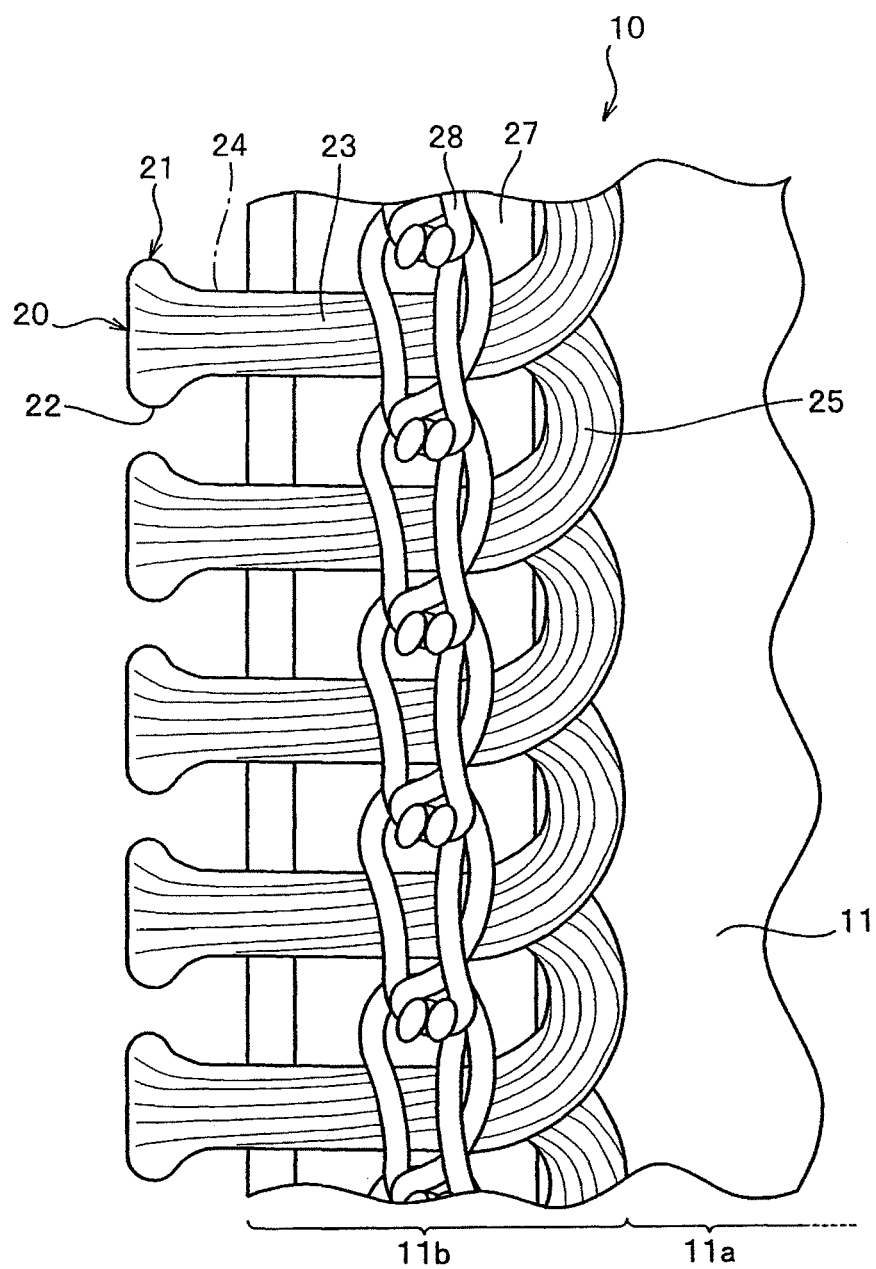
FIG. 2 is an enlarged view illustrating a main part of the slide fastener at an enlarged scale.
Figure 3:
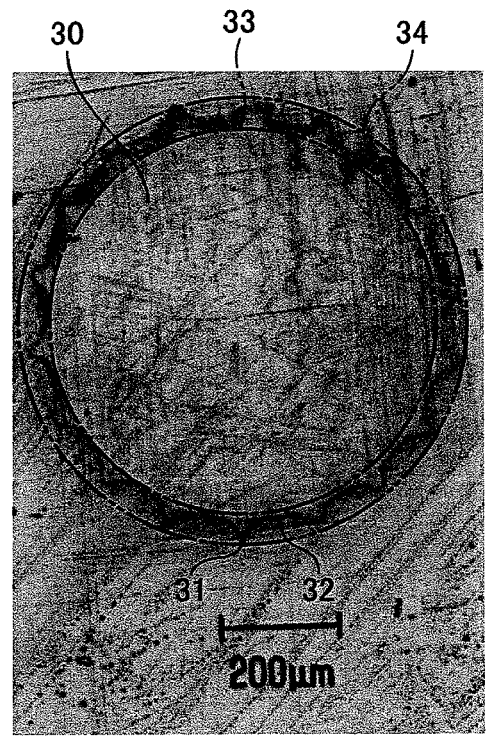
FIG. 3 is a cross-sectional view of an upper leg part of a fastener element disposed in the slide fastener.
Figure 4:
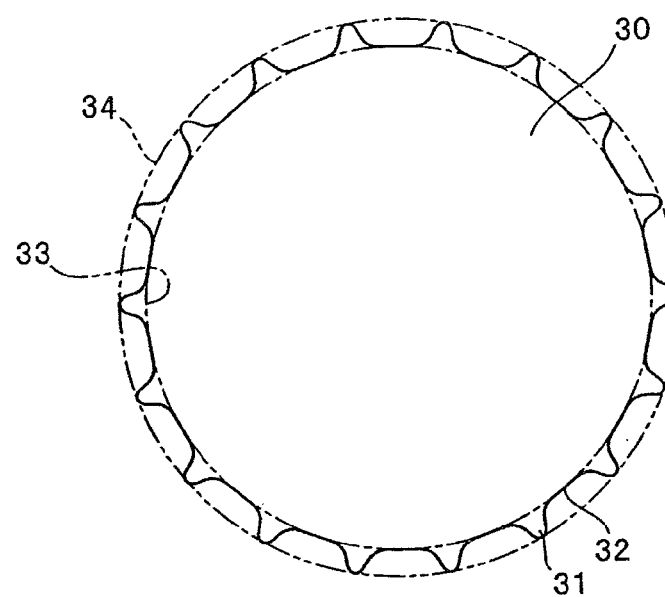
FIG. 4 is a schematic view schematically illustrating a cross-section of the upper leg part.
Figure 5:
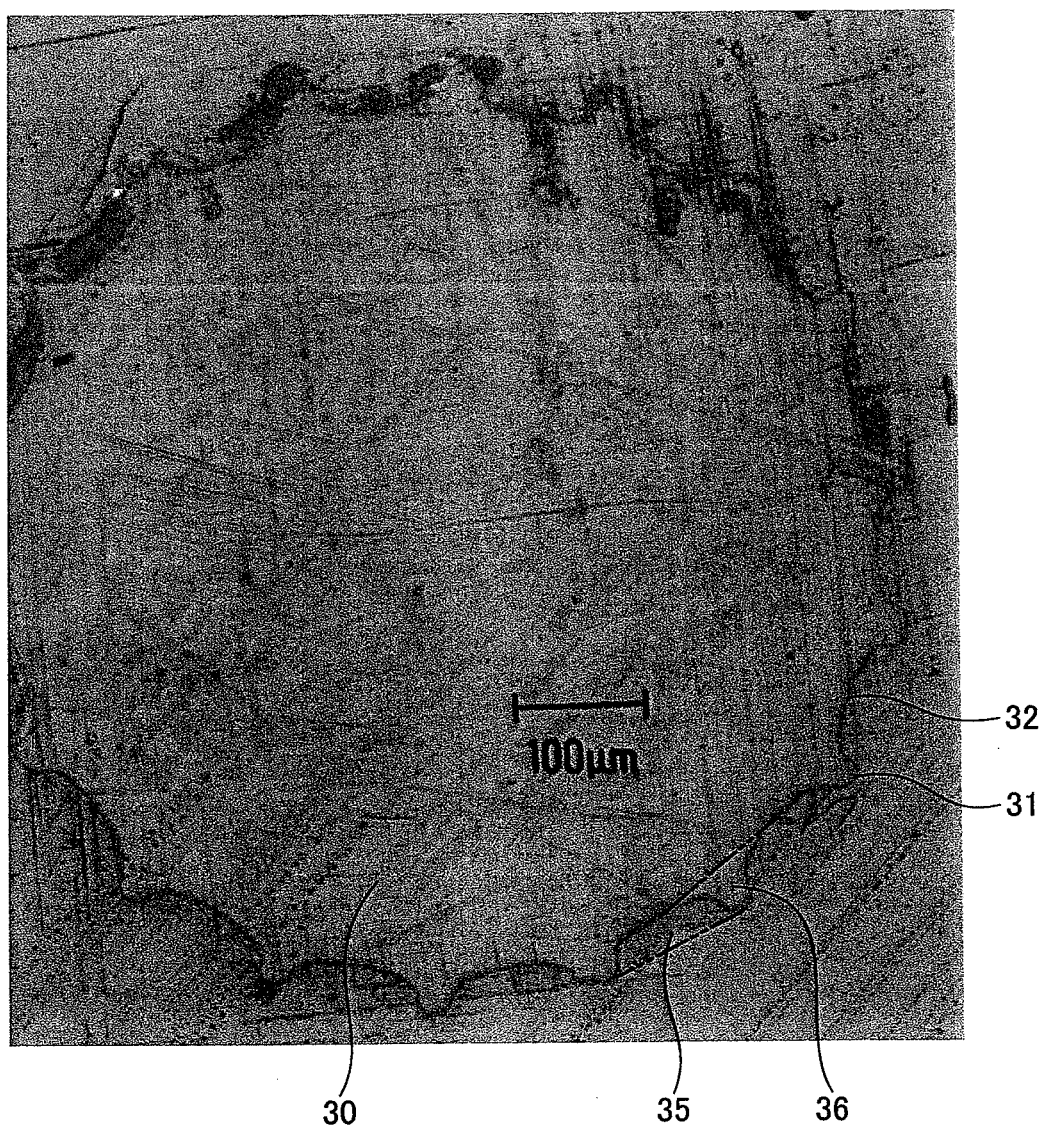
FIG. 5 is an enlarged cross-sectional view illustrating a cross-section of the upper leg part of the fastener element at an enlarged scale.
Figure 6:
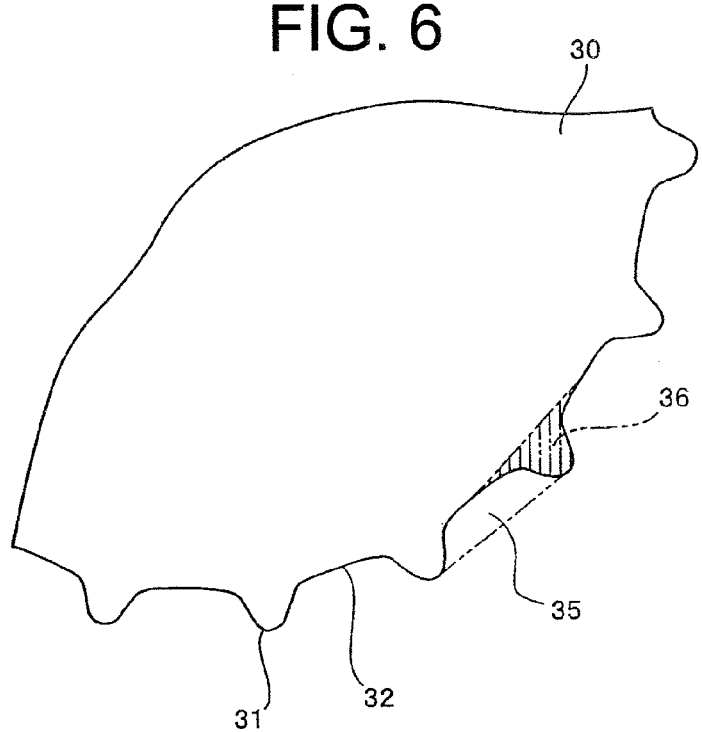
FIG. 6 is a schematic view schematically illustrating a cross-section of a main part of the upper leg part.

Here, FIG. 1 is a front view illustrating a slide fastener according to an embodiment, and FIG. 2 is an enlarged view illustrating a main part of the slide fastener at an enlarged scale. FIG. 3 is a cross-sectional view of an upper leg part of a fastener element disposed in the slide fastener, and FIG. 4 is a schematic view schematically illustrating a cross-section of the upper leg part. FIG. 5 is an enlarged cross-sectional view illustrating a cross-section of the upper leg part of the fastener element at an enlarged scale, and FIG. 6 is a schematic view schematically illustrating a cross-section of a main part of the upper leg part. In FIGS. 4 and 6, for better understanding of the features of the invention, cross-sections are depicted white rather than being hatched.

Moreover, in the following description, a forward-backward direction indicates a length direction of a fastener tape, which is the same direction as a sliding direction in which a slider slides. Moreover, a horizontal direction indicates a tape width direction of a fastener tape, which is parallel to a tape surface of the fastener tape and is orthogonal to the tape length direction. Further, a vertical direction indicates a tape front-rear direction orthogonal to the tape surface of the fastener tape, and in particular, a direction toward a side of the fastener tape to which a fastener element is attached is defined as an upper side and the opposite direction is defined as a lower side.

A slide fastener 1 according to this embodiment includes a pair of left and right fastener stringers 10, a top stop 6 fixed to one end side of an element row 21 of the fastener stringer 10, a bottom stop 7 fixed to the other end side of the element row 21 of the fastener stringer 10, and a slider 8 attached so as to be slidable along the element row 21, and is configured as a so-called standard slide fastener.

The slide fastener 1 is configured such that the slider 8 is slid toward the top stop 6 to allow the left and right element rows 21 to engage with each other to close the slide fastener 1, and the slider 8 is slid toward the bottom stop 7 to allow the left and right element rows 21 to be separated from each other to open the slide fastener 1. The top stop 6, the bottom stop 7, and the slider 8 of the slide fastener 1 have the same configuration as those generally used in the related art.

The left and right fastener stringers 10 that form such a slide fastener 1 includes a fastener tape 11 woven to a small width and the element row 21 disposed along a tape edge portion 11b of the fastener tape 11. The element row 21 is configured such that a coil-shaped continuous fastener element 20 is sewn to be attached to the fastener tape 11 by sewing a sewing thread 28 to draw a double ring in a state where a core thread 27 is inserted through upper and lower leg parts 23 and 24 as described later. In the invention, the element row 21 may be formed by sewing the fastener element 20 to the fastener tape 11 without providing the core thread 27.

The fastener tape 11 of this embodiment includes a tape body portion 11a which is a portion sewn to be attached to a fastener-attached product such as clothes or bags and a tape edge portion 11b (sometimes, referred to as an element attaching portion) which is disposed on one side edge of the tape body portion 11a and to which the fastener element 20 is attached.

Although the fastener tape 11 of this embodiment is made from a woven structure, the configuration of the fastener tape 11 of the invention is not particularly limited, and for example, the material and thickness of the warp and weft threads that form the fastener tape 11 may be optionally set, and the fastener tape 11 may be made from a knitting structure.

The fastener element 20 of this embodiment has a continuous coil shape, and as will be described in detail below, is formed by molding a monofilament 30 that is made from a thermoplastic resin such as polyamide or polyester. In this case, depending on the purpose of the slide fastener 1, the fastener element 20 may be colored with a desired color using a dye or a pigment, and the fastener element 20 may be plated with metal. Moreover, the fastener element 20 may be made transparent.

The fastener element 20 includes a coupling head 22 that protrudes in a forward-backward direction (the length direction of the fastener tape 11), a pair of upper and lower leg parts 23 and 24 that extends in the tape width direction toward the inner side of the tape from the coupling head 22, and a connecting portion 25 that connects an extension end portion of the upper leg part 23 or the lower leg part 24 to the lower leg part 24 or the upper leg part 23 of the fastener element 20 that is adjacent in the forward-backward direction.

For example, when the fastener element is formed in a zigzag shape, the zigzag-shaped fastener element includes a coupling head, a pair of upper and lower leg parts that extends in the tape width direction toward the inner side of the tape from the coupling head, and a connecting portion that connects the fastener elements that are adjacent in the forward-backward direction. The upper leg part of each fastener element is connected to the upper leg part of an adjacent fastener element on the forward or backward side by the connecting portion. Moreover, the lower leg part of each fastener element is connected to the lower leg part of an adjacent fastener element on the backward or forward side by the connecting portion. In this case, the fastener tape is disposed between the upper leg part and the lower leg part of the fastener element.

Moreover, a plurality of projections 31 provided continuously along the length direction of the monofilament 30 that forms the fastener element 20 and a plurality of recesses 32 provided between the projections 31 are formed on the circumferential surface of the fastener element 20, and the plurality of projections 31 and recesses 32 are disposed in parallel to each other.

In the invention, the shapes of the projection 31 and the recess 32 are not particularly limited. However, for example, if the outer circumferential surface of the projection 31 and the recess 32 has an angulated shape in a cross-sectional view of the monofilament 30, the projection 31 is easily scraped due to friction with the slider 8, and the slider 8 is easily caught at the fastener element 20 so that the sliding property of the slider 8 may deteriorate. Thus, it is preferable that the outer circumferential surface of the projection 31 and the recess 32 be formed in a curved shape.

Here, in the cross-sectional view of the monofilament 30, a position or a portion of each projection 31 that is farthest from the central position of the monofilament 30 in the radial direction is defined as an apex of the projection 31. That is, the apex of the projection 31 is a distal end of the projection 31 and can be defined as a position at which the distance from the center of a first imaginary circle 33 or a second imaginary circle 34 described below that can be imaginarily drawn in the cross-sectional view of the monofilament 30 is the largest.

On the other hand, a position or a portion of each recess 32 that is nearest from the central position of the monofilament 30 in the radial direction is defined as a bottom of the recess 32. In this case, a position at which a straight line that passes in the radial direction through the midpoint of a line that connects the apexes of adjacent two projections 31 and the center of the first imaginary circle 33 or the second imaginary circle 34 in the cross-sectional view of the monofilament 30 crosses the recess 32 may be approximated as the bottom of the recess 32.

In this embodiment, a largest diameter of the monofilament 30 that forms the fastener element 20 is set to 0.74 mm. Here, the largest diameter of the monofilament 30 means the diameter of the second imaginary circle 34 that is formed so as to connect the apexes of the respective projections 31, which will be described later.

Moreover, as illustrated by the cross-sectional view of the monofilament 30 in the upper leg part 23 in FIGS. 3 to 6, for example, eighteen projections 31 are disposed approximately at an equal interval on the circumferential surface of the monofilament 30. Further, the interval in the circumferential direction between the apexes of the projections 31 (hereinafter, this interval will be referred to as a pitch of the projections 31) is set in the range from 24 µm to 200 µm. The mean pitch of the projections 31 in the monofilament 30 was calculated to be 129 µm.

Since the shape of the projection 31 may be crushed and deformed when the monofilament 30 is molded into the fastener element 20 as will be described later, a case where the position of the apex is not clearly identified may occur depending on the shape of the projection 31. In this case, the circumference may be calculated from the largest diameter of the monofilament 30 and divided by the number of projections 31 to calculate the mean pitch of the projections 31. The mean pitch of the projections 31 is preferably from 24 µm to 200 µm.

In this case, the protruding height of each projection 31 is set in the range from 2.5 µm to 200 µm, and the mean protruding height of all projections 31 is set in the range from 5 µm to 100 µm. In a practical case, when the largest diameter of the monofilament 30 is set to 0.74 mm as in this embodiment, the protruding height of each projection 31 was set in the range from 5 µm to 150 µm (in particular, from 5 µm to 50 µm), and the mean protruding height of all projections 31 is set to 10 µm.

Since the protruding height of each projection 31 is 2.5 µm or more, light can be stably diffused and reflected from the respective projections 31 and recesses 32. On the other hand, since the protruding height of each projection 31 is 200 µm or less, it is possible to appropriately secure the area of a region that guarantees the strength of the monofilament 30 (that is, the area of a region of the monofilament 30 on the inner side than a circumferential region where the projection 31 and the recess 32 are formed). Thus, it is possible to stably obtain such strength that the fastener element 20 can be used in the slide fastener 1.

Moreover, if the protruding height of each projection 31 is 200 μm or less, the element surface is prevented from being jagged or rough when the fastener element 20 is observed. Further, by decreasing the protruding height of the projection 31, when the left and right fastener elements 20 of the slide fastener 1 engage with each other, the left and right coupling heads 22 smoothly alternately engage with each other, and a predetermined transverse tensile strength of the fastener chain can be stably obtained.

Moreover, in the invention, the protruding height of the projection 31 is measured in the following manner. First, in the cross-sectional view of the monofilament 30, a first imaginary line is drawn so as to connect the apexes of adjacent two projections 31, and a position of the recess 32 that is disposed between both projections 31 and is farthest from the imaginary line is determined as a reference point. Subsequently, a tangential line is drawn from the reference point with respect to a circle of which the center is located at the center of the cross-section of the monofilament 30 and which passes the reference point, and a second imaginary line is drawn so as to pass the apex of the projection 31 in parallel to the tangential line. Moreover, the distance between the tangential line and the second imaginary line is measured, whereby the protruding height of the projection 31 is calculated.

Moreover, the diameter of the first imaginary circle 33 that is formed so as to connect the bottoms of the recesses 32 in the cross-section of the monofilament 30 in the upper leg part 23 and the lower leg part 24 has a dimension of 80% or more, and preferably, a dimension of 90% or more, with respect to the diameter of the second imaginary circle 34 that is formed so as to connect the apexes of the projections 31.

In particular, in the case of this embodiment, the diameter of the first imaginary circle 33 that is formed so as to connect the bottoms of the recesses 32 is 0.72 mm, and the diameter (the largest diameter of the monofilament 30) of the second imaginary circle 34 that is formed so as to connect the apexes of the projections 31 is 0.74 mm. Thus, the proportion of the diameter of the first imaginary circle 33 to the diameter of the second imaginary circle 34 is set to 97%.

Further, as illustrated in FIGS. 5 and 6, the area 35 of a space region of each recess 32, partitioned by imaginarily connecting the apexes of the adjacent projections 31 is set to be larger than the area 36 (the area of a hatched portion in FIG. 6) of each projection 31, partitioned by imaginarily connecting the bottoms of the adjacent recesses 32. In this case, although it is preferable that the area 35 of the space region of each recess 32 be larger than the area 36 of each projection 31, the area 35 of the space region of a predetermined number of recesses 32 may be larger than the area 36 of a predetermined number of projections 31, and the mean area 35 of the space regions of the recesses 32 may be larger than the mean area 36 of the projections 31.

As described above, in the fastener element 20 of this embodiment, the protruding height of each projection 31 is controlled to a predetermined range of sizes, and the proportion of the diameter of the first imaginary circle 33 to the diameter of the second imaginary circle 34 is 97%, which is a large value. Thus, even when a plurality of recesses 32 are formed on the circumferential surface of the monofilament 30, it is possible to appropriately secure the strength of the monofilament 30 such that the monofilament 30 can be used as the slide fastener 1. Moreover, in the fastener element 20, since the projections 31 and the recesses 32 are disposed in parallel to each other, it is possible to prevent the strength of the monofilament 30 from locally decreasing in the length direction of the monofilament 30.

In the fastener element 20 of this embodiment, when the form of the projection 31 and the recess 32 is observed in the cross-sectional view of the monofilament 30, the curvature of a convex curved surface of at least one of all projections 31 is set to be larger than the curvature of a concave curved surface of the recess 32 that is adjacent to the projection 31. Thus, the curved state of the curved surface of the recess 32 is gentler than the curved surface of the projection 31. Since the projections 31 of which the curved surface has a larger curvature than the recesses 32 are disposed on the circumferential surface of the monofilament 30, light can be effectively diffused and reflected from the projections 31, and the luster of the monofilament 30 can be reduced or removed.

In addition, for example, when the projection 31 is crushed and the form of the projection 31 is deformed as will be described later, an arc-shaped curved line that close to the outer circumferential surface of the projections 31 and the recesses 32 may be imaginarily drawn on the cross-sectional picture of the monofilament 30, and the curvature of the convex curved surface of the projection 31 and the curvature of the concave curved surface of the recess 32 may be calculated based on the imaginary curved line.

In particular, in this case, at least one projection 31 disposed on the circumferential surface of the monofilament 30 is configured such that, in the cross-sectional view of the monofilament 30, one curved surface portion disposed to extend from the apex to the recess 32 on one side in the circumferential direction is asymmetrical with respect to the other curved surface portion disposed to extend from the apex to the recess 32 on the other side in the circumferential direction. In this manner, the left and right projections 31 are formed so as to be asymmetrical about the apex in the cross-sectional view of the monofilament 30. Thus, when light is reflected from the projection 31, since the light can be reflected in a different manner from one curved surface portion and the other curved surface portion, it is possible to diffusely reflect light more effectively.

Further, in the fastener element 20 of this embodiment, as illustrated in FIG. 2, the arrangement direction of the projections 31 and the recesses 32 disposed in the upper and lower leg parts 23 and 24 is twisted (inclined) with respect to the tape width direction which is the extension direction of the upper and lower leg parts 23 and 24.

In particular, in the case of this embodiment, when the slide fastener 1 is observed from the front side (see FIG. 1), the projection 31 and the recess 32 on the upper leg part 23 are disposed so as to be twisted in the direction from the coupling head 22 toward the connecting portion 25 so as to be inclined toward the front side (toward the top stop 6). In this case, the projection 31 and the recess 32 on the upper leg part 23 are twisted so as to be inclined in the same direction and in parallel to each other.

The lower leg part 24 is not visible since the lower leg part 24 is located on the lower side of the upper leg part 23 when the slide fastener 1 is observed from the front side. However, when the coil-shaped fastener element 20 is observed from a back side that is on the opposite side of the front side, the projection 31 and the recess 32 on the lower leg part 24 are disposed so as to be twisted in the direction from the coupling head 22 toward the connecting portion 25 so as to be inclined toward the front side (toward the top stop 6).

In addition, in the invention, the twisting direction of the projection 31 and the recess 32 may be opposite to the direction described in the first embodiment. That is, when the upper leg part 23 of the fastener element 20 is observed from the front side, the projection 31 and the recess 32 may be disposed so as to be twisted in the direction from the coupling head 22 toward the connecting portion 25 so as to be inclined toward the rear side (toward the bottom stop 7).

In the case of this embodiment, the projection 31 and the recess 32 on the lower leg part 24 are twisted so as to be inclined in the same direction and in parallel to each other. The twisting direction of the projection 31 and the recess 32 on the upper and lower leg parts is the same in a zigzag-shaped fastener element.

Thus, when the left and right fastener elements 20 are engaged to close the slide fastener 1, the projection 31 and the recess 32 disposed on the upper and lower leg parts 23 and 24 of the right fastener element 20 are twisted in a direction different from that of the projection 31 and the recess 32 disposed on the upper and lower leg parts 23 and 24 of the left fastener element 20.

That is, when the left and right fastener elements 20 are sewn to the fastener tape 11 to form the left and right fastener stringers 10, the twisting direction of the projection 31 and the recess 32 of the fastener element 20 of the left fastener stringer 10 is different from the twisting direction of the projection 31 and the recess 32 of the fastener element 20 of the right fastener stringer 10. Here, the difference in the twisting direction implies that an inclined extension line corresponding to the twisting of the projection 31 or the recess 32 on the upper and lower leg parts 23 and 24 of one of the left and right fastener elements 20 and an inclined extension line corresponding to the twisting of the projection 31 or the recess 32 on the upper and lower leg parts 23 and 24 of the other fastener element 20 cross each other at an angle. When the inclination corresponding to the twisting of the projection 31 or the recess 32 is arc-shaped, for example, the inclined extension line can be a tangential line of the arc.

In this manner, since the projection 31 and the recess 32 on the upper and lower leg parts 23 and 24 are disposed so as to be twisted with respect to the extension direction of the upper and lower leg parts 23 and 24, a larger number (of types) of projections 31 can appear on the upper surface which serves as an exposed surface of the fastener element 20 as compared to a case where the projection 31 and the recess 32 are disposed in parallel to the extension direction of the upper and lower leg parts 23 and 24, for example.

Therefore, even when a variation occurs in the size and shape of the projections 31 disposed on the circumferential surface of the monofilament 30, light is diffused and reflected from a larger number (of types) of projections 31, whereby the delustering effect can be made uniform in the respective fastener elements 20. Thus, it is possible to stably reduce or remove the luster of the monofilament 30 on the entire fastener element 20.

Next, a method for manufacturing the fastener stringer 10 according to this embodiment will be described.

First, the fastener tape 11 and the fastener element 20 are prepared. The fastener tape 11 is woven to a desired woven structure by inserting a weft thread into an opening of a warp thread by reciprocating a carrier bar using a loom, for example.

Figure 7:
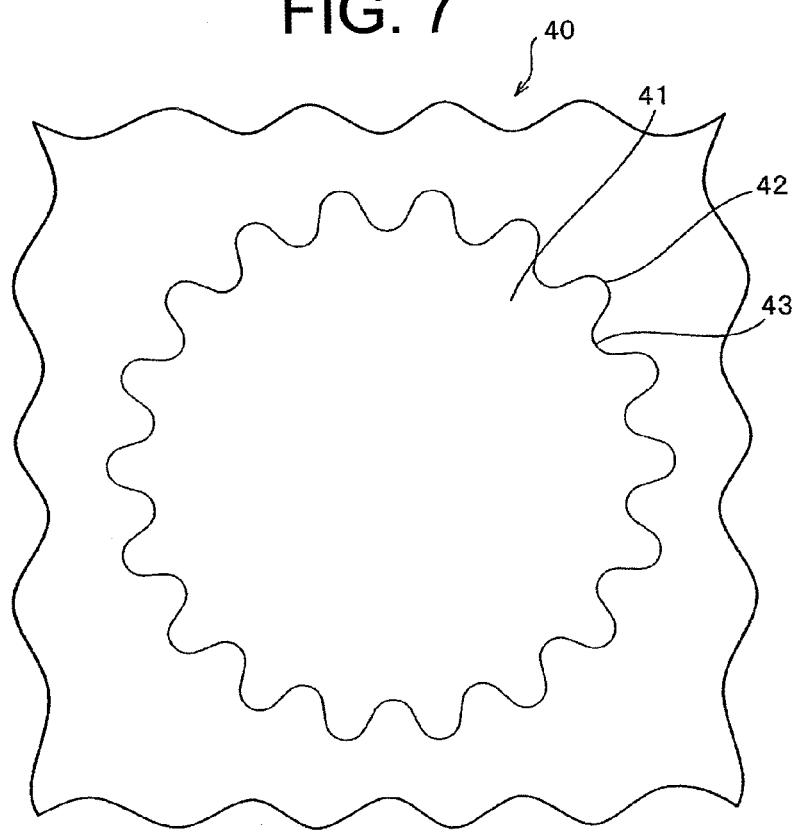
FIG. 7 is a view schematically describing the shape of a discharge opening of an extrusion molding nozzle that extrudes and molds a monofilament.

Moreover, in order to obtain the fastener element 20 separately from the fastener tape 11, first, the monofilament 30 made from a thermoplastic resin such as polyamide or polyester is extruded and molded using an extrusion molding nozzle 40 illustrated in FIG. 7. In this case, a discharge opening 41 of the extrusion molding nozzle 40 has a toothed wheel shape such that eighteen convex portions 42 are formed on the circumferential edge portion of the discharge opening 41. Moreover, convex portions 42 of the discharge opening 41 and concave portions 43 formed between the convex portions 42 have a symmetrical shape, and the curvature of a convex curved surface of the convex portion 42 is set to approximately the same value as the curvature of a concave curved surface of the concave portion 43.

Thus, by extruding and molding a thermoplastic resin from the extrusion molding nozzle 40, it is possible to obtain the monofilament 30 in which a plurality of projections 31 disposed in parallel to each other continuously along the length direction and a plurality of recesses 32 disposed between the projections 31 are disposed on the entire circumferential surface. The largest diameter of the monofilament 30 obtained by the extrusion molding is approximately 2.2 mm.

Subsequently, stretching processing is performed on the monofilament 30 which has been subjected to extrusion molding in the above-described manner. By performing the stretching processing, it is possible to decrease the diameter of the monofilament 30 and to increase the strength of the monofilament 30 by oriented crystallization of polymers. Moreover, in the monofilament 30 immediately after the extrusion molding and the monofilament 30 during the stretching processing, a portion of the monofilament 30 is more likely to swell outward by receiving a greater internal pressure as it is located closer to the central line of the monofilament 30. As a result, in the monofilament 30 after the stretching processing, the curvature of a concave curved surface of the recess 32 decreases (that is, the radius of curvature increases), and the curved state of the concave curved surface becomes gentler than the convex curved surface of the projection 31. Moreover, the protruding height of the projection 31 can be made smaller than the size that corresponds to the shape of the discharge opening 41 of the extrusion molding nozzle 40.

Specifically, in this embodiment, by performing stretching processing, the largest diameter of the monofilament 30 can be decreased to a size of 0.74 min which is ⅓ of the size (2.2 mm) before the stretching processing. Moreover, the size of the projection 31 can be controlled so that the protruding height of the projection 31 is in the range of 5 μm or more and 100 μm or less, and the mean protruding height of all projections 31 is 10 μm. Therefore, as described above, the diameter of the first imaginary circle 33 that is formed so as to connect the bottoms of the recesses 32 in the cross-sectional view of the monofilament 30 can be controlled to a value that is 80% or more of the diameter of the second imaginary circle 34 that is formed so as to connect the apexes of the projections 31. Thus, it is possible to stably obtain the strength of the monofilament 30 such that the monofilament 30 can be used in the slide fastener 1.

After that, the continuous fastener element 20 is molded from the stretched monofilament 30. In this case, the continuous fastener element 20 is molded, for example, by pressing the monofilament 30 at a predetermined interval to form the swollen coupling head 22 and winding the monofilament 30 into a coil shape.

By molding the continuous fastener element 20 in this manner, the direction of the projections 31 on the upper and lower leg parts 23 and 24 can be twisted with respect to the extension direction of the upper and lower leg parts 23 and 24. Since various stresses are applied to the monofilament 30 itself when the continuous fastener element 20 is molded from the monofilament 30, the projections 31 are crushed whereby plastic deformation may occur in the projections 31 and the recesses 32 disposed on the circumferential surface of the monofilament 30.

Moreover, since the coupling heads 22 and the connecting portions 25 of the fastener element 20 receive a larger amount of plastic deformation when molding the fastener element as compared to the upper and lower leg parts 23 and 24 of the fastener element 20, the protruding height (the depth of the recesses 32) of the projections 31 disposed in the coupling head 22 and the connecting portion 25 is smaller than that of the upper and lower leg parts 23 and 24. Due to this, it is possible to improve the sliding property of the slider 8 when the fastener stringer 1 is formed.

After that, the continuous fastener element 20 molded in this manner is sewn to the tape edge portion 11b of the fastener tape 11, whereby the fastener stringer 10 of this embodiment having the above-described configuration can be stably manufactured. In this embodiment, the molded fastener element 20 can be continuously sewn to the tape edge portion 11b of the fastener tape 11 while molding the continuous fastener element 20 from the monofilament 30. Therefore, it is possible to efficiently manufacture the fastener stringer 10.

In the fastener stringer 10 according to this embodiment manufactured in this manner, eighteen projections 31 formed continuously along the length direction of the monofilament 30 and eighteen recesses 32 formed between the projections 31 are disposed in parallel in a predetermined size on the circumferential surface of the monofilament 30. Due to this, since the projection 31 and the recess 32 can reduce regular reflection of light emitted to the fastener element 20 and increase diffuse reflection, it is possible to stably reduce or remove the luster of the monofilament 30.

Further, in the fastener stringer 10 of this embodiment, since the projections 31 disposed on the upper and lower leg parts 23 and 24 of the fastener element 20 are twisted with respect to the extension direction of the upper and lower leg parts 23 and 24, a larger number of projections 31 and recesses 32 appear on the upper surface of the fastener element 20 as compared to a case where the projections are disposed in parallel to the extension direction of the upper and lower leg parts. Due to this, it is possible to make the delustering effect of the projection 31 and the recess 32 uniform and to uniformly reduce or remove the luster of the monofilament 30 on the entire fastener element 20.

In particular, in this embodiment, since the delustering effect of the fastener element 20 can be obtained even when a sand blast process described in Patent Document 1, for example, is not performed, it is possible to simplify the manufacturing step of the fastener stringer 10 and to provide the fastener stringer 10 at a low cost.

Moreover, since the projections 31 and the recesses 32 having a predetermined size are disposed on the entire circumferential surface of the fastener element 20, it is possible to obtain a new appearance (visual aspect) of the fastener element 20, which is not found in the conventional art, while the surface of the fastener element 20 is prevented from being jagged or rough.

Further, since the projections 31 and the recesses 32 are disposed in parallel to each other and continuously along the length direction of the monofilament 30, it is possible to prevent the strength of the monofilament 30 from locally decreasing in the length direction of the monofilament 30 and to stably secure the strength such that the monofilament 30 can be used in the slide fastener 1.

Furthermore, since the outer circumferential surface of the projections 31 and the recesses 32 is formed in an approximately curved surface shape, when the slide fastener 1 is formed and the slider 8 is slid, it is possible to prevent the slider 8 from being caught at the projection 31 and the recess 32 and to smoothly slide the slider 8. Further, since the projections 31 and the recesses 32 are continuously disposed along the length direction of the monofilament 30, it is possible to prevent the resistance between the slider 8 and the fastener element 20 from changing during the sliding of the slider 8 and to stably secure satisfactory operability of the slide fastener 1.

Moreover, in the slide fastener 1 having a pair of left and right fastener stringers 10 having the above-described configuration, the luster of the monofilament 30 on the entire fastener element 20 is reduced or removed. In particular, in the slide fastener 1, as described above, the projections 31 and the recesses 32 disposed on the upper and lower leg parts 23 and 24 of the right fastener element 20 are twisted in a direction different from that of the projections 31 and the recesses 32 disposed on the upper and lower leg parts 23 and 24 of the left fastener element 20.

Due to this, since light can be diffused and reflected indifferent directions from the projections 31 and the recesses 32 disposed on the left and right fastener elements 20, it is possible to reduce or remove the luster of the monofilament 30 more effectively. Thus, the slide fastener 1 can be preferably used in such a fastener-attached product that the luster peculiar to the monofilament 30 does not match the design.

In the above-described embodiment, although the standard slide fastener 1 and the fastener stringer 10 used in the slide fastener 1 have been described mainly, the type of the slide fastener 1 of the invention is not particularly limited, and the invention can be preferably applied to a concealed slide fastener, for example.

Figure 8:
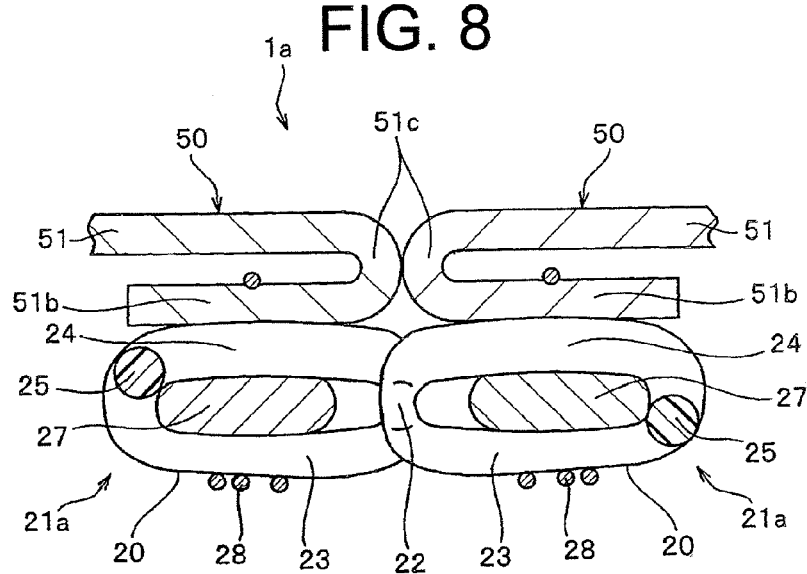
FIG. 8 is a cross-sectional view illustrating a slide fastener according to another embodiment of the invention.

Here, a concealed slide fastener 1a different from the above-described embodiment will be described briefly with reference to FIG. 8. The concealed slide fastener 1a includes a pair of left and right fastener stringers 50 and a top stop, a bottom stop, and a slider (not illustrated) which have been generally used in the conventional art.

The fastener stringer 50 includes a fastener tape 51 bent in an approximately U-shape and an element row 21a disposed along a tape edge portion 51b of the fastener tape 51. The element row 21a is formed by sewing a coil-shaped continuous fastener element 20 to the fastener tape 51 using a sewing thread 28. In this case, the fastener tape 51 is configured such that when the left and right element rows 21a are engaged, the tape bent portions 51c of the left and right fastener tapes 51 make contact with each other.

Moreover, in the concealed slide fastener 1a, the fastener element 20 has the same configuration as the above-described embodiment and includes a coupling head 22, upper and lower leg parts 23 and 24, and a connecting portion 25. However, the direction of the fastener element 20 sewn to the fastener tape 51 is different from that of the above-described first embodiment.

That is, when the fastener element 20 is sewn, before the fastener tape 51 is bent in the above-described manner, a core thread 27 is inserted between the upper and lower leg parts 23 and 24 of the fastener element 20, and the upper and lower leg parts 23 and 24 are sewn to the tape edge portion 51b of the fastener tape 51 in a state where the coupling head 22 faces the inner side of the fastener tape 51. After that, the fastener tape 51 is bent in a U-shape, and thermosetting is performed on the bent fastener tape 51 to obtain the fastener stringer 50 in which the coupling head 22 of the fastener element 20 protrudes outward from the tape bent portion 51c of the fastener tape 51.

The two fastener stringers 50 obtained in this manner are combined together, whereby the concealed slide fastener 1a capable of allowing the coupling heads 22 of the left and right fastener elements 20 to appropriately engage with each other can be formed. The concealed slide fastener 1a can be used by being attached to a fastener-attached product such as clothes or bags so that the fastener element 20 is disposed on the outer surface side (exposed surface side) of the slide fastener 1a.

In such a concealed slide fastener 1a, since the same projections 31 and recesses 32 as those of the standard slide fastener 1 according to the above-described embodiment are disposed on the entire circumferential surface of the fastener element 20, the same effects as those described in the standard slide fastener 1 can be obtained.

Moreover, in the standard slide fastener 1 according to the above-described embodiment and the concealed slide fastener 1a according to the modification example, a case where the diameter (the largest diameter) of the monofilament 30 that forms the fastener element 20 is 0.74 mm, and eighteen projections 31 are disposed on the circumferential surface of the monofilament 30 has been described. However, in the invention, the size of the diameter (the largest diameter) of the monofilament 30 and the number of projections 31 and recesses 32 disposed on the circumferential surface of the monofilament 30 are not particularly limited but can be changed optionally.

The number of projections 31 and recesses 32 disposed on the circumferential surface of the monofilament 30 may be set in the following manner. Although the number is different depending on the size of the diameter (the largest diameter) of the monofilament 30, when the diameter of the monofilament 30 is in the range of 0.35 mm or more and 2.30 mm or less, for example, in order to allow light to be effectively diffused and reflected from the projections 31 and the recesses 32 to reliably reduce or remove the luster of the monofilament 30, it is preferable that the number of projections 31 and recesses 32 disposed on the circumferential surface of the monofilament 30 is set in the range of 12 or more and 72 or less, and in particular, of 12 or more and 48 or less.

Figure 9:
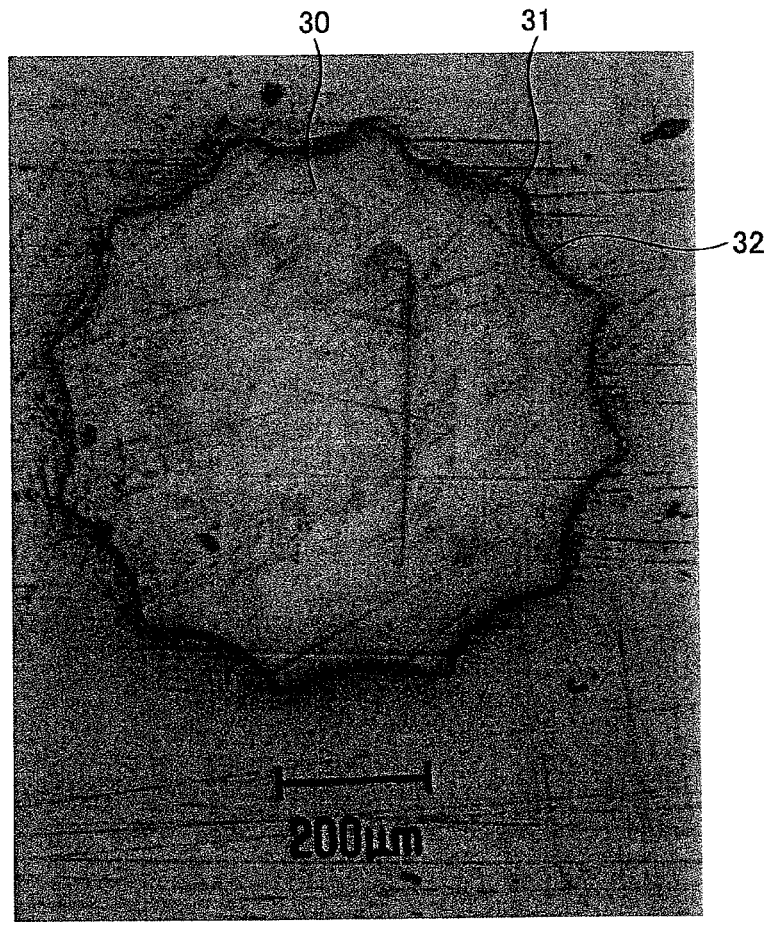
FIG. 9 is a cross-sectional view of an upper leg part of a fastener element in which 12 projections are disposed on the circumferential surface of a monofilament.
Figure 10:
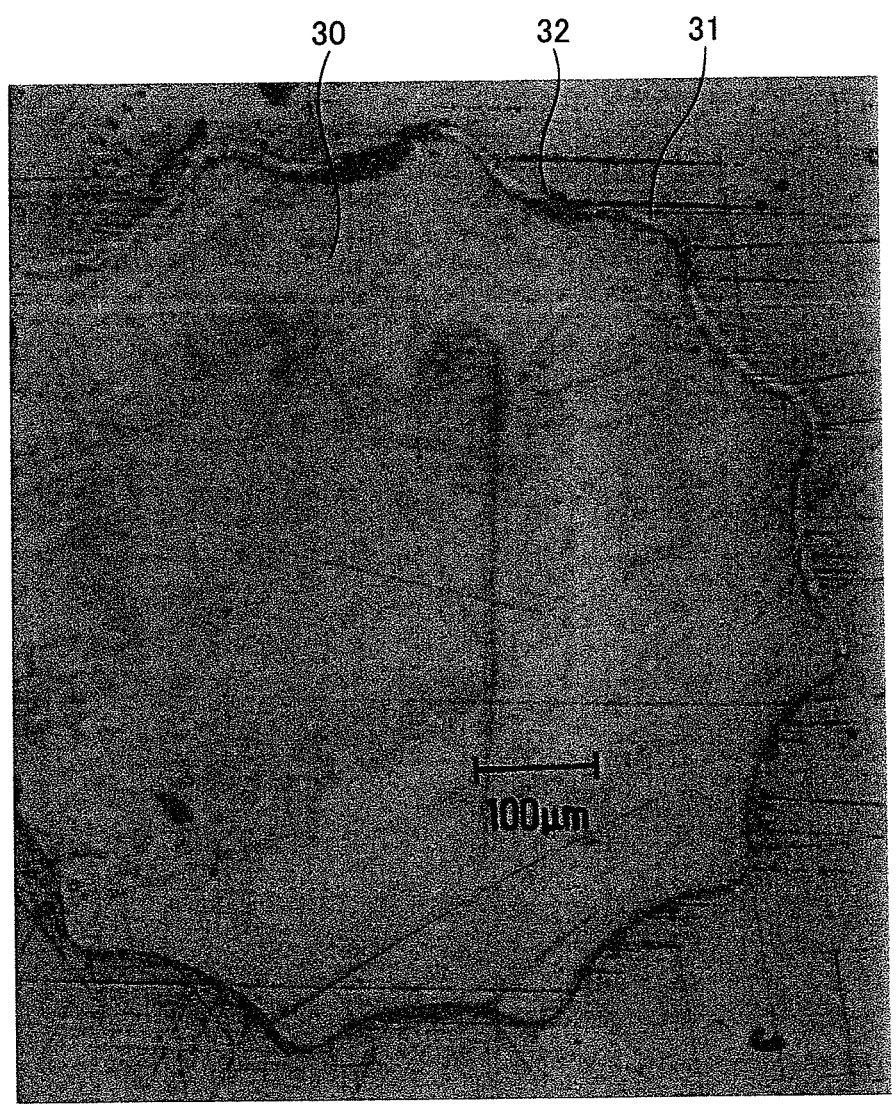
FIG. 10 is an enlarged cross-sectional view illustrating a cross-section of an upper leg part of the fastener element at an enlarged scale.
Figure 11:
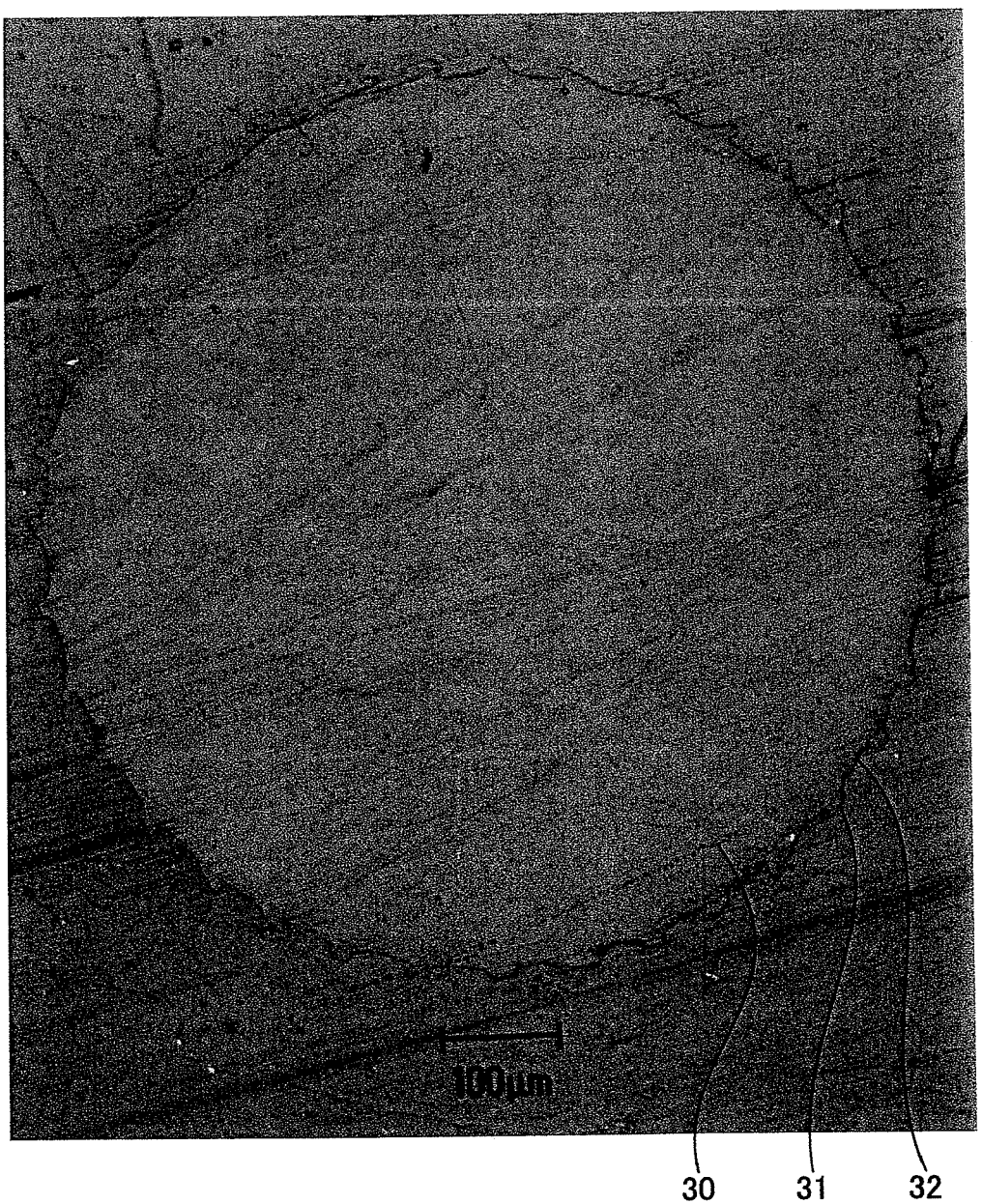
FIG. 11 is a cross-sectional view of an upper leg part of a fastener element in which 36 projections are disposed on the circumferential surface of the monofilament.
Figure 12:
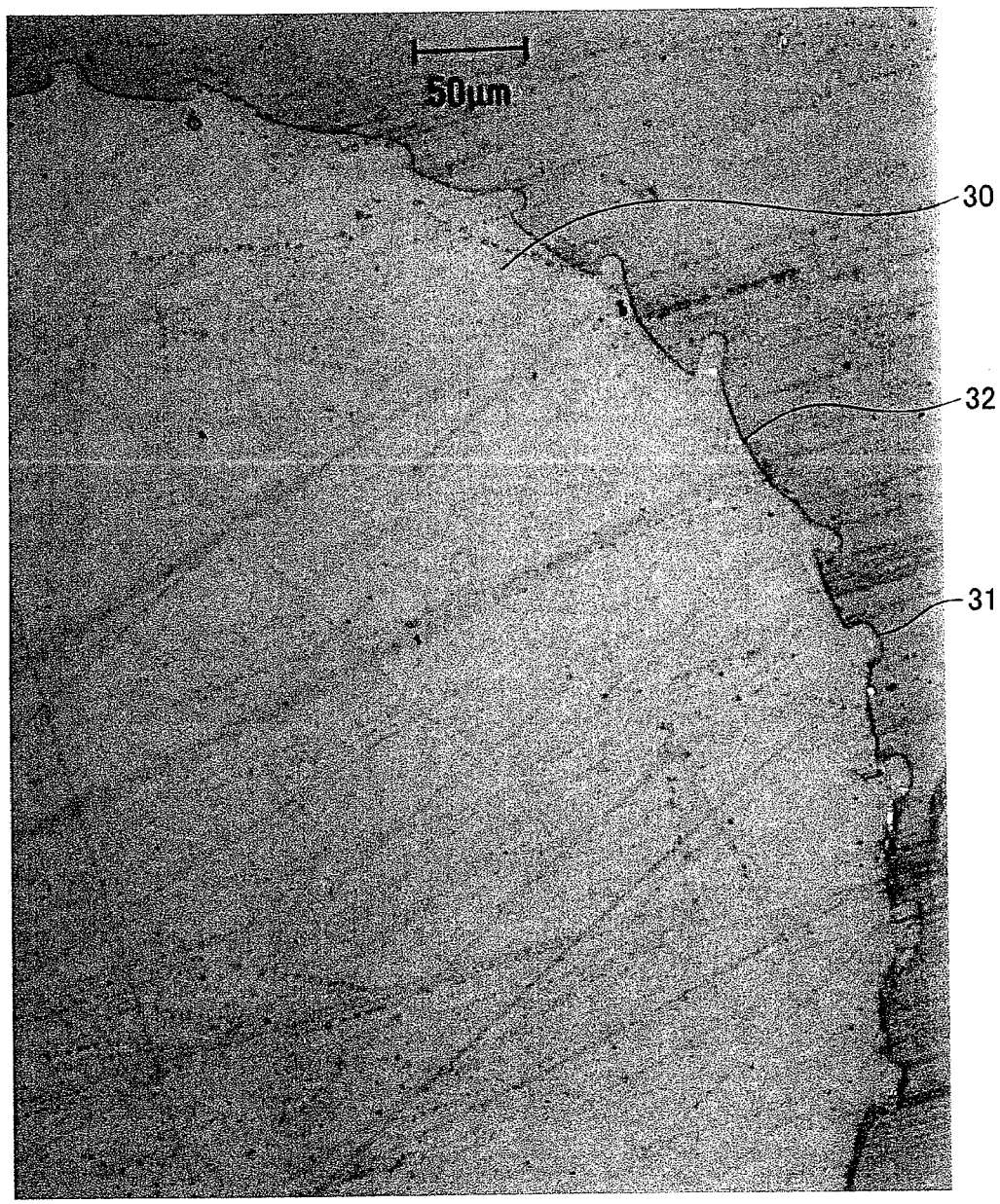
FIG. 12 is an enlarged cross-sectional view illustrating a cross-section of an upper leg part of the fastener element at an enlarged scale.
Figure 13:
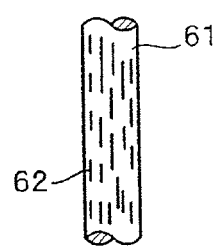
FIG. 13 is a side view illustrating a part of a conventional monofilament.

For example, when the diameter (the largest diameter) of the monofilament 30 is set to 0.74 mm similarly to the above-described embodiment, by setting the number of projections 31 and recesses 32 disposed on the circumferential surface of the monofilament 30 to 12 as illustrated in FIGS. 9 and 10 and to 36 as illustrated in FIGS. 11 and 12, it is possible to effectively reduce or remove the luster of the monofilament 30 while securing the strength of the monofilament 30.

DESCRIPTION OF REFERENCE NUMERALS 1, 1a: Slide fastener
6: Top stop
7: Bottom stop
8: Slider
10: Fastener stringer
11: Fastener tape
11a: Tape body portion
11b: Tape edge portion
20: Fastener element
21, 21a: Element row
22: Coupling head
23: Upper leg part
24: Lower leg part
25: Connecting portion
27: Core thread
28: Sewing thread
30: Monofilament
41: Projection
32: Recess
33: First imaginary circle
34: Second imaginary circle
35: Area of space region
36: Area of projection
40: Extrusion molding nozzle
41: Discharge opening
42: Convex portion
43: Concave portion
50: Fastener stringer
51: Fastener tape
51b: Tape edge portion
51c: Tape bent portion

The invention claimed is:

1. A fastener stringer for a slide fastener, in which a continuous fastener element molded from a monofilament made from a thermoplastic resin is attached to a tape edge portion of a fastener tape, and the fastener element includes a coupling head, upper and lower leg parts extending in a tape width direction from the coupling head, and a connecting portion that connects one of the upper and lower leg parts to one of the upper and lower leg parts of a fastener element that is adjacent in a length direction of the fastener tape, wherein:

a plurality of fine projections disposed continuously along the length direction of the monofilament and a plurality of recesses disposed between the projections are disposed on a circumferential surface of the monofilament, a diameter of the monofilament is in a range from 0.35 mm to 2.30 mm, and a number of the projections and recesses disposed on the circumferential surface of the monofilament is in a range from 12 to 72, a cross-sectional shape of each of the projections is curved convexly, and a cross-sectional shape of each of the recesses is curved concavely, convex curved surfaces of the projections and concave curved surfaces of the recesses are alternately formed continuously, a curvature of the convex curved surfaces of the projections is larger than a curvature of the concave curved surfaces of the recesses in a cross-section of the monofilament, at least the projections disposed on the upper and lower leg parts are twisted with respect to an extension direction of the upper and lower leg parts, and a plurality of the projections disposed on the upper leg part or the lower leg part in a twisted state face the same direction.

2. The fastener stringer according to claim 1, wherein a protruding height of the projection is set in a range of 2.5 μm or more and 200 μm or less.

3. The fastener stringer according to claim 1, wherein:
the fastener element includes a recess disposed between the projections, and
in a cross-sectional view of the monofilament, a diameter of a first imaginary circle that is formed so as to connect bottoms of the recesses has a size that is 80% or more of a diameter of a second imaginary circle that is formed so as to connect apexes of the projections.

4. The fastener stringer according to claim 1, wherein, in a cross-sectional view of the monofilament, an interval in a circumferential direction between predetermined positions of the projections is set in a range of 24 μm or more and 200 μm or less.

5. The fastener stringer according to claim 3, wherein, in a cross-sectional view of the monofilament, at least one of the projections is configured such that one curved surface portion disposed to extend from the apex to the recess on one side is asymmetrical with respect to another curved surface portion disposed to extend from the apex to the recess on the other side.

6. A slide fastener wherein it includes a pair of left and right fastener stringers according to claim 1.

7. The slide fastener according to claim 6, wherein a twisting direction of the projection with respect to the extension direction of the upper and lower leg parts is different between the left and right fastener stringers.

* * * * *

UNITED STATES PATENT AND TRADEMARK OFFICE
CERTIFICATE OF CORRECTION

PATENT NO. : 9,289,034 B2  
APPLICATION NO. : 13/884311  
DATED : March 22, 2016  
INVENTOR(S) : Yoshimichi Yamakita et al.

Page 1 of 1

It is certified that error appears in the above-identified patent and that said Letters Patent is hereby corrected as shown below:

In the Specification

In column 14, line 36, delete "0.74 min" and insert -- 0.74 mm --, therefor.

Signed and Sealed this  
Seventh Day of June, 2016

Michelle K. Lee  
*Director of the United States Patent and Trademark Office*